Nov. 22, 1938.　　　W. E. SCHAEFER　　　2,137,417
OVERLOAD SAFETY DEVICE
Filed Dec. 17, 1936　　　2 Sheets-Sheet 1

INVENTOR.
William E. Schaefer
BY
Gifford, Scull & Burgess
ATTORNEYS.

Nov. 22, 1938.  W. E. SCHAEFER  2,137,417
OVERLOAD SAFETY DEVICE
Filed Dec. 17, 1936  2 Sheets-Sheet 2
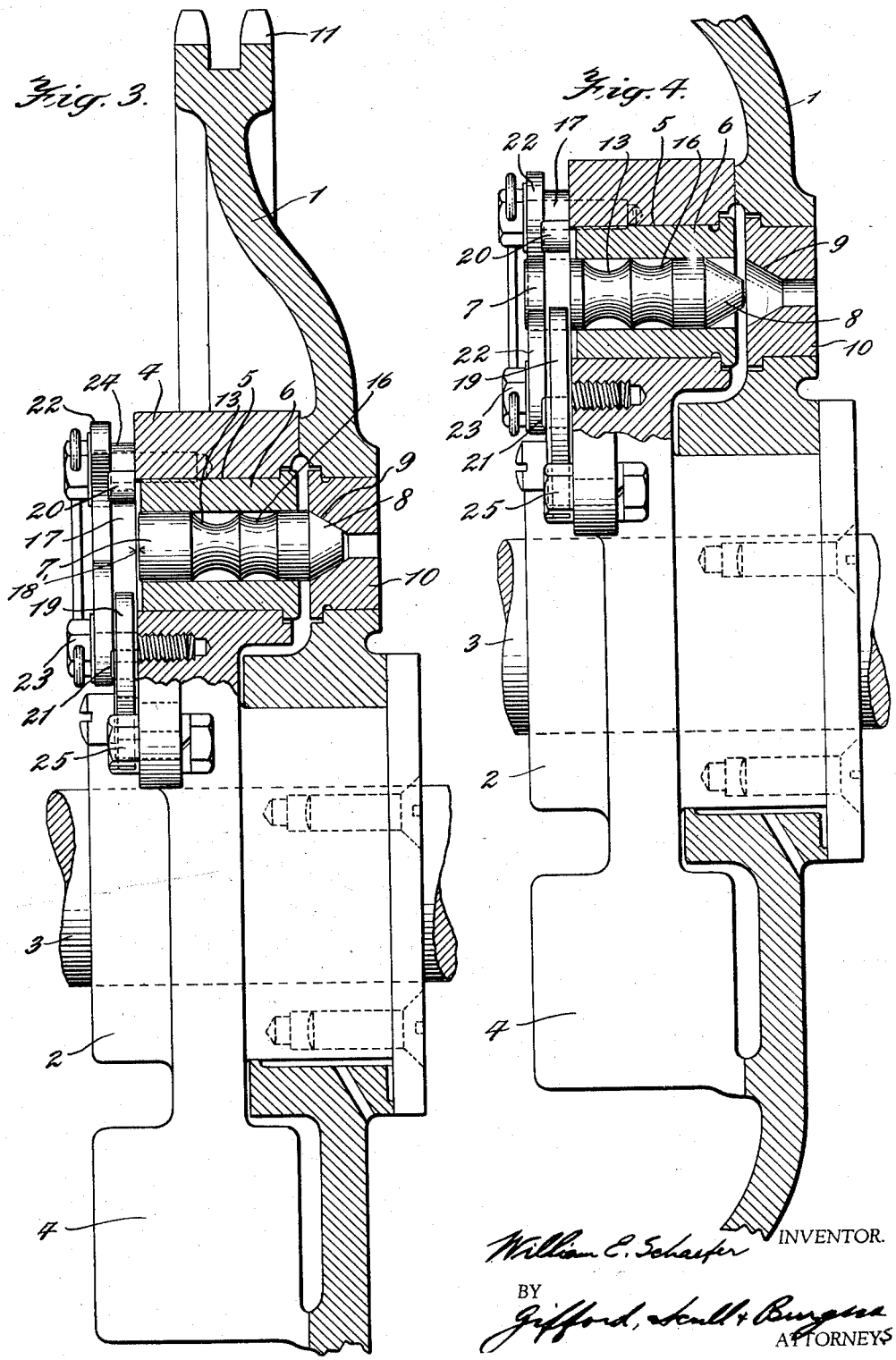
William E. Schaefer INVENTOR.
BY
Gifford, Scull & Burgess
ATTORNEYS.

Patented Nov. 22, 1938

2,137,417

UNITED STATES PATENT OFFICE 2,137,417

OVERLOAD SAFETY DEVICE

William E. Schaefer, West Hartford, Conn., assignor to The Whitney Chain & Mfg. Company, Hartford, Conn., a corporation of Connecticut Application December 17, 1936, Serial No. 116,291

2 Claims. (Cl. 192—56)

This invention relates to a novel and improved form of overload safety device, and more particularly to such a device as is shown in the patent to R. F. Dow, No. 2,045,572. The invention will be best understood from the following description and the annexed drawings, in which I have shown a selected embodiment of the invention and in which:

Fig. 3 is a view approximately on the line 3—3 of Fig. 1 but showing more of the sprocket than appears in Fig. 1;

Fig. 4 is a view on the same plane as Fig. 3, showing certain of the parts in different positions than they occupy in Fig. 3.

Figure 1:
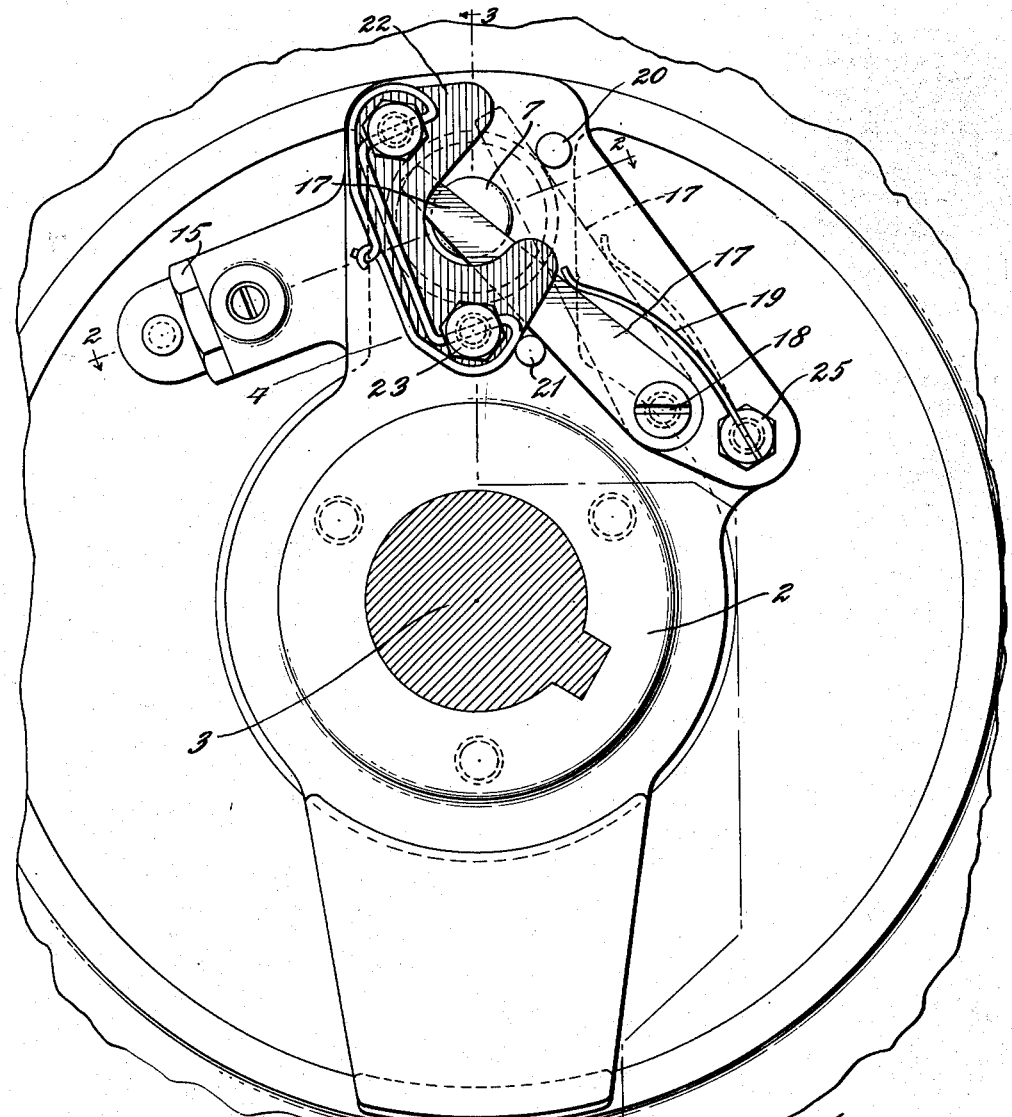
Fig. 1 is a view taken at right angles to a shaft and showing the invention in elevation, this view showing the device as seen from the left of Fig. 3.

In said Patent 2,045,572 is shown a device which includes a driving connection between driven and driving elements, and which is automatically disconnected when an overload is placed upon it. My invention is particularly adapted for use with the patented device when used in a machine where the starting torque of the machine is greater than that which may be termed the release torque or, in other words, the torque at which the driving and driven elements become disconnected. For example, machines which are started slowly and in which the speed is gradually increased may be operated satisfactorily by the device shown in said patent, and my invention makes the same device applicable to machines which are started almost instantly with the maximum speed instead of having that maximum speed reached gradually.

For the sake of illustration, I have shown similar driven and driving elements to what are shown in said patent, said elements comprising a driving element in the form of a sprocket 1 rotatably mounted upon a hub 2 keyed to a shaft 3. The hub 2 has integral therewith an outwardly extending plate 4 provided with a hole 5 therethrough, here shown as parallel to the axis of the shaft, and in this hole is secured a bushing 6 in which is slidably mounted a pin 7 having a tapered end 8 adapted to be received in a tapered recess 9 in a bushing 10 secured to the sprocket.

The pin 7 forms the driving connection between the sprocket and the hub, and the sprocket may be considered as the driving element, and the hub as the driven element. Where the expression "sprocket" is used, it will be understood that it is not intended to be a limiting term, since the invention is not limited to the specific driving and driven elements indicated. The driving element or sprocket 1 may be provided with the usual teeth 11 by which it may be rotated through a chain, as is well known in the art, and its rotation may be transmitted to the driven element or hub through the pin 7.

Figure 2:
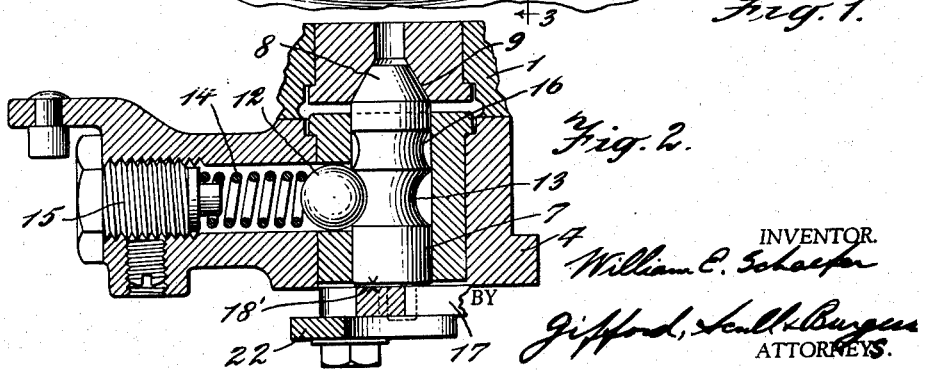
Fig. 2 is a section approximately on the line 2—2 of Fig. 1.

As more fully brought out in said Patent 2,045,572, an auxiliary driving device is used for yieldingly holding the pin in engagement with the sprocket, and a similar device is used herein. As best shown in Fig. 2, the device comprises a ball 12 adapted to engage a circumferential recess 13 in the pin 7, the ball being urged into that recess by a compression spring 14, the force of which may be adjusted by means of a screw 15. Assuming that the sprocket is driving the hub and that an overload occurs, that overload will cam the tapered end 8 of the pin out of the tapered recess 9 and thus break the driving connection between the driving and driven elements. This camming action is resisted by the camming action of the ball 12 against the walls of the groove 13, but after the connection has been broken, the ball 12 will yieldingly hold the pin in disconnecting position by engagement with a second relatively shallow circumferential groove 16 on the pin.

When the starting torque applied to the driving connection is relatively great, the connection is maintained by means of a stop, here shown as a lever 17 pivoted at 18 on the hub and urged by a spring 19 into the position shown in Figs. 1, 2, and 3 wherein it extends across the end of the pin 7. Preferably, the stop is spaced from the end of the pin a small distance, indicated in Figs. 2 and 3 by the numeral 18', this distance being, for example, on the order of 0.015".

With the arrangement shown when the starting torque is applied to the driving connection, since this is assumed to be larger than the release torque, the result will be to tend to break the driving connection by camming the tapered end 8 out of the tapered recess 9. A slight movement of the pin for the distance 18' may take place, thus avoiding too sudden a stress upon the pin, but the movement of the pin is resisted by the action of the ball 12 against the spring 14 and is almost immediately limited by the stop 17. Then as rotation of the shaft takes place under the action of the starting torque and that torque is decreased to the normal running torque, the stop 17 will be thrown outwardly away from the shaft by centrifugal force, against the action of the spring 19, until it hits a stop pin 20, all this taking place when the speed of rotation of the shaft corresponds to the normal running torque or to some torque less than the starting torque. Now if an overload is placed upon the driving connection, it is free to act in the manner described in said patent, since the stop is in the dotted line position shown in Fig. 1. In other words, the pin may move to the position indicated in Fig. 4, where it will be held by the ball 12 in the groove 16 until it is desired to start the machine again when the pin may be released by a light blow on the outer end thereof, which will serve to release it from the action of the ball 12 and spring 14.

If desired, a stop pin 21 may be used to limit the movement of the stop 17 against the action of the spring 19, and I also find that it may be desirable to provide a guard 22 secured to the hub as by screws 23 cooperating with spacers 24, this guard serving to prevent outward movement of the stop 17 away from the end of the pin. In other words, the guard and the face of the hub cooperate to define a path for movement of the stop 17. The spring 19 may be made adjustable in any suitable way. In the present instance, it is secured to the cap screw 25 which may be turned to make the requisite adjustment.

While I have shown the invention as embodied in a specific form, it is to be understood that various changes in details may be made without departing from the scope of the invention as defined by the appended claims.

I claim:

1. In combination, rotary driven and driving elements, a driving connection between said elements comprising a pin slidably mounted on one of said elements and having a tapered end normally received in a tapered recess in the other of said elements and adapted to be cammed out of said recess upon exertion of an overload on the pin, a stop in position to prevent said camming of the pin out of said recess when the elements are stationary and movable out of said position only when said elements have attained a predetermined speed of rotation, said position of the stop permitting limited movement of the pin in the recess when starting torque is applied thereto, said pin having a cam surface, and a cam member spring-pressed against said surface and resisting said limited movement of the pin and to tend to return the pin into engagement with the walls of the recess.

2. In combination, two elements comprising a shaft and a sprocket rotatably mounted thereon, a driving connection between said elements comprising a pin slidably supported on said shaft and movable lengthwise thereof, said pin having a tapered end normally received in a tapered recess in said sprocket, whereby the pin will be cammed out of the recess upon exertion of an overload on the pin, a pivoted stop carried by the shaft and adapted to extend across the end of said pin and thus prevent its displacement from said recess, said pivot being so placed that centrifugal force will cause movement of the stop out of position across the end of the pin, and a spring resisting said movement.

WILLIAM E. SCHAEFER.